(12) United States Patent
Lee et al.

(10) Patent No.: US 7,544,969 B2
(45) Date of Patent: Jun. 9, 2009

(54) DISPLAY SUBSTRATE, METHOD OF MANUFACTURING THE SAME, DISPLAY DEVICE HAVING THE DISPLAY SUBSTRATE AND METHOD OF DRIVING THE DISPLAY DEVICE

(75) Inventors: Gi-Chang Lee, Seoul (KR); Il-Gon Kim, Seoul (KR); Cheol-Min Kim, Seoul (KR); Joon-Ha Park, Busan (KR)

(73) Assignee: Samsung Electronics Co., Ltd. (KR)

( * ) Notice: Subject to any disclaimer, the term of this patent is extended or adjusted under 35 U.S.C. 154(b) by 187 days.

(21) Appl. No.: 11/694,262

(22) Filed: Mar. 30, 2007

(65) Prior Publication Data

US 2007/0228411 A1    Oct. 4, 2007

(30) Foreign Application Priority Data

Mar. 31, 2006    (KR)    ........................ 10-2006-0029683

(51) Int. Cl.
*H01L 29/04* (2006.01)
*H01L 31/20* (2006.01)
*H01L 31/036* (2006.01)
*H01L 31/0376* (2006.01)

(52) U.S. Cl. .......................... 257/59; 257/72; 257/257; 345/76; 345/98

(58) Field of Classification Search .................. 257/59, 257/72, 257; 345/76, 98, 204
See application file for complete search history.

(56) References Cited

U.S. PATENT DOCUMENTS

2007/0080905 A1* 4/2007 Takahara ..................... 345/76
2007/0200803 A1* 8/2007 Kimura ........................ 345/76

* cited by examiner

*Primary Examiner*—Phuc T Dang
(74) *Attorney, Agent, or Firm*—Cantor Colburn LLP

(57) ABSTRACT

A display substrate includes a plurality of pixel parts, each including a first and second gate lines, a source line, first, second, and third transistors, and a pumping capacitor. A display device includes a display panel, a gate driving part, a source driving part, and an output selecting part. Each pixel part of a display panel includes a transmissive part, a reflective part, and an adjusting part. The adjusting part adjusts the transmission voltage charged in the reflective part to a reflection voltage based on a control voltage. Thus, transmission voltage applied to the transmissive part is adjusted to reflection voltage to be applied to the reflective part. Therefore, optical reflectivity and optical transmissivity versus voltage are matched with each other, while embodying a single cell-gap and applying a single voltage.

10 Claims, 18 Drawing Sheets

REFLECTIVE REGION    TRANSMISSIVE REGION

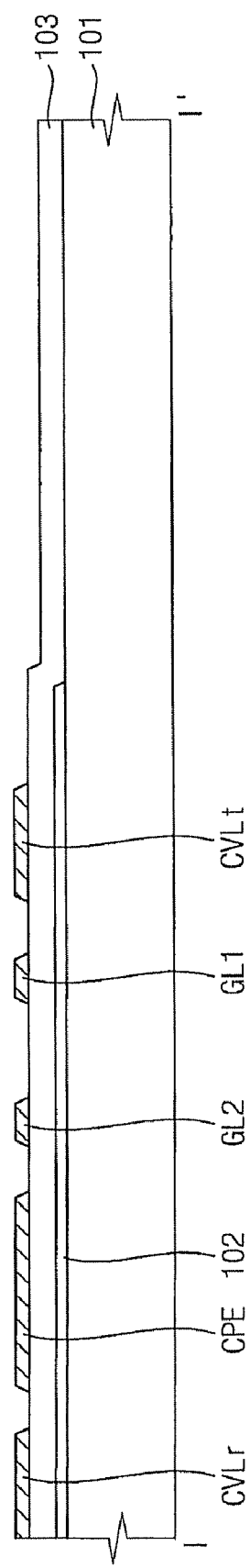

DISPLAY SUBSTRATE, METHOD OF MANUFACTURING THE SAME, DISPLAY DEVICE HAVING THE DISPLAY SUBSTRATE AND METHOD OF DRIVING THE DISPLAY DEVICE

This application claims priority to Korean Patent Application No. 2006-29683, filed on Mar. 31, 2006, and all the benefits accruing therefrom under 35 U.S.C. §119, the contents of which in its entirety are herein incorporated by reference.

BACKGROUND OF THE INVENTION

1. Field of the Invention

The present invention relates to a display substrate, a method of manufacturing the same, a display device having the display device, and a method of driving the display device. More particularly, the present invention relates to a display substrate capable of improving a display quality of a transflective type liquid crystal display ("LCD") device, a method of manufacturing the same, a display device having the display device, and a method of driving the display device.

2. Description of the Related Art

Generally, a liquid crystal display ("LCD") panel of an LCD device includes a lower substrate and an upper substrate facing each other, and a liquid crystal layer interposed between the two substrates. The LCD panel displays an image by changing an arrangement of liquid crystal molecules in the liquid crystal layer via an applied electric field.

The LCD panel is classified according to a type of light source. In particular, the LCD panel is classified into a reflective type displaying an image by reflecting external light incident from an exterior, a transmissive type displaying an image by transmitting internal light incident from a rear, and a transflective type displaying an image by both reflecting external light and transmitting internal light.

In a conventional transflective type LCD panel, a transmissivity-to-voltage curve (hereinafter, "T-V curve") in transmissive mode is different form a reflectivity-to-voltage curve (hereinafter, "R-V curve") in reflective mode. The difference between the T-V curve and the R-V curve means that transmissivity and reflectivity versus the same voltage do not match with each other. The difference between the T-V curve and the R-V curve causes a problem that deteriorates a display quality of a transflective type LCD device.

BRIEF SUMMARY OF THE INVENTION

The present invention recognizes importance of matching the T-V curve and the R-V curve of the transflective type LCD device, and thus, the present invention provides a display substrate capable of matching reflectivity versus voltage with transmissivity versus voltage, while embodying a single cell-gap and applying a single voltage.

The present invention also provides a method of manufacturing the display substrate.

The present invention also provides a display device having the display substrate.

The present invention also provides a method of driving the display device.

In a display substrate according to exemplary embodiments of the present invention, the display substrate includes a plurality of pixel parts. Each pixel part is divided into a reflective area including a reflective electrode and a transmissive area including a transparent electrode. The pixel part includes a first gate line, a second gate line, a source line, a first transistor, a second transistor, a pumping capacitor, and a third transistor. The second gate line is parallel with the first gate line. The source line intersects with the first and second gate lines. The first transistor includes a first source electrode, a first gate electrode connected to the first gate line, and a first drain electrode connected with the transparent electrode. The second transistor includes a second gate electrode connected to the first gate line, a second source electrode connected with the first drain electrode, and a second drain electrode connected with the reflective electrode. The pumping capacitor has a first terminal and a second terminal. The first terminal of the pumping capacitor is connected with the second drain electrode. The third transistor includes a third gate electrode connected to the second gate line, a third source electrode connected with the source line, and a third drain electrode connected with the second terminal of the pumping capacitor.

In a method of manufacturing a display substrate according to exemplary embodiments of the present invention, the method includes forming a channel pattern in each pixel area on a base substrate, forming a gate metal pattern on the base substrate on which the channel pattern is formed, forming a first insulating interlayer on the base substrate on which the gate metal pattern is formed, forming a source metal pattern in contact with the channel pattern via contact holes, forming an organic insulating layer with uniform thickness on the base substrate on which the source metal pattern is formed, and forming a transparent electrode connected with the first transistor through a first via-hole and a reflective electrode connected with the second transistor through a second via-hole. The gate metal pattern includes a first gate line, a second gate line, a first common line overlapping with the channel pattern, and an electrode pattern of a pumping capacitor. The first insulating interlayer includes a plurality of contact holes exposing the channel pattern. The source metal pattern includes a first source electrode and a first drain electrode of a first transistor electrically connected with the first gate line, a second source electrode and a second drain electrode of a second transistor electrically connected with the first gate line, and a third source electrode and a third drain electrode of a third transistor electrically connected with the second gate line. The organic insulating layer includes the first via-hole and the second via-hole.

In a display device according to exemplary embodiments of the present invention, the display device includes a display panel, a gate driving part, a source driving part, and an output selecting part. The display panel includes a plurality of pixel parts. Each pixel part includes a transmissive part in which a transmission voltage transmitted through a source line according to activation of a first gate line is charged, a reflective part in which the transmission voltage is charged, and an adjusting part that adjusts the transmission voltage charged in the reflective part to a reflection voltage based on a control voltage transmitted through the source line according to activation of a second gate line. The gate driving part outputs first and second gate signals to the first and second gate lines respectively. The first and second gate signals activate both the first and second gate lines in a first period, and activate only the second gate line in a second period. The source driving part outputs the transmission voltage in the first period. The output selecting part outputs the transmission voltage to the source line in the first period, and selectively outputs the control voltage to the source line in the second period.

In a method of driving a display device according to exemplary embodiments of the present invention, the display device includes a plurality of pixel parts. Each pixel part includes a first transistor including a first gate electrode connected with a first gate line, a first liquid crystal capacitor connected with the first transistor, a second transistor connected with the first gate line and the first liquid crystal capacitor, a second liquid crystal capacitor connected with the second transistor, a third transistor connected with a second gate line and a source line, and a pumping capacitor connected with the second and third transistors respectively. The method includes turning on the first, second, and third transistors by activating the first and second gate lines in a first period, charging each of the first and second liquid crystal capacitors with a transmission voltage applied to the source line according to turn-on of the first, second, and third transistors, turning off the first and second transistors and turning on the third transistor by activating only the second gate line in a second period, and adjusting the transmission voltage charged in the second liquid crystal capacitor to a reflection voltage by applying a control voltage applied to the source line to the second liquid crystal capacitor according to turn-on of the third transistor.

According to the above-described display substrate, the method of manufacturing the display substrate, the display device having the display substrate, and the method of driving the display substrate, the present invention is capable of matching optical reflectivity and optical transmissivity versus voltage while embodying a single cell-gap and applying a single voltage.

BRIEF DESCRIPTION OF THE DRAWINGS

The above and other features and advantages of the present invention will become more apparent by describing in detailed exemplary embodiments thereof with reference to the accompanying drawings, in which:

FIGS. 8A to 8D are cross-sectional views for describing an exemplary method of manufacturing the exemplary first display substrate in FIG. 6;

DETAILED DESCRIPTION OF THE INVENTION

Figure 1A:
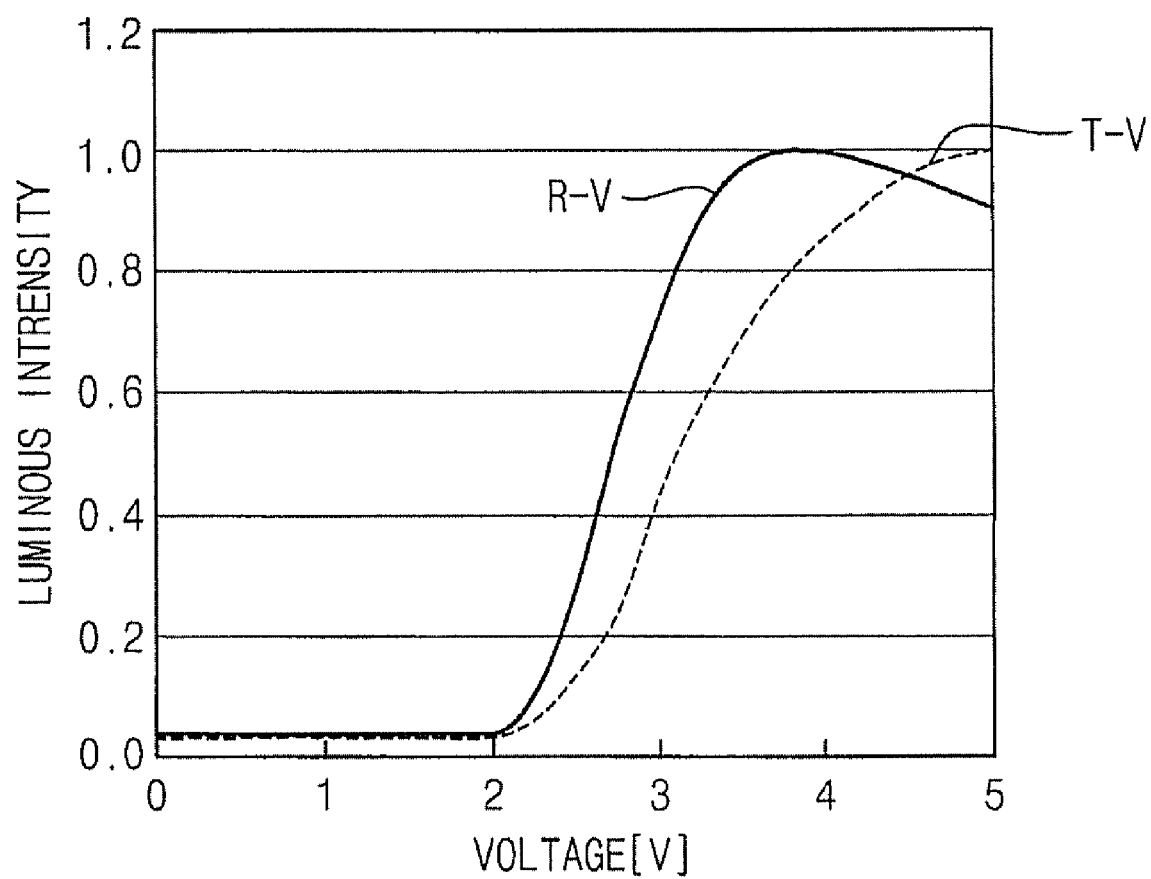
FIG. 1A is a graph showing a T-V curve and an R-V curve of a transflective type display device of the prior art.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "on" or "onto" another element, it may be directly on the other element or intervening elements may also be present. In contrast, when an element is referred to as being "directly on" another element, there are no intervening elements present. Like reference numerals refer to similar or identical elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

Hereinafter, the present invention will be explained in detail with reference to the accompanying drawings.

Figure 1B:
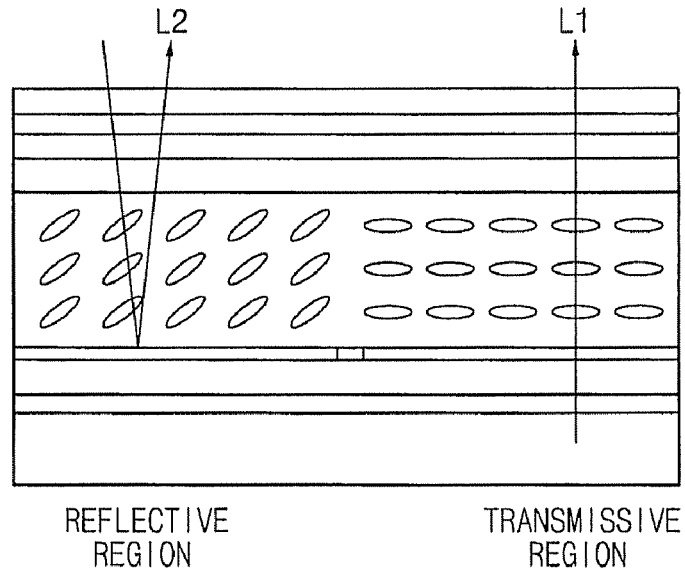
FIG. 1B is a diagrammatic cross-sectional view illustrating an exemplary transflective type display device.

FIG. 1A is a graph showing a T-V curve and an R-V curve of a transflective type display device of the prior art. FIG. 1B is a diagrammatic cross-sectional view illustrating an exemplary transflective type display device.

Referring to FIGS. 1A and 1B, a transflective type LCD panel includes a transmissive part and a reflective part. In the transmissive part, an image is displayed through a first light L1 that is incident from a rear of the LCD panel and passes through a transmissive window. In the reflective part, an image is displayed through a second light L2 that is incident from a front of the LCD panel and reflected from a bottom.

Because of an optical path difference between the transmissive part and the reflective part, optical reflectivity and transmissivity versus voltage that is applied to a liquid crystal are different from each other. When a liquid crystal mode is normally black, luminous intensity is the maximum at about 5V (volts) in a transmissive mode. On the contrary, in a reflective mode, the luminous intensity is the maximum at about 3.5V. In other words, the transmissive part needs about 5V in transmission voltage to display white gradation, while the reflective part needs about 3.5V in reflection voltage.

According to exemplary embodiments of the present invention, 5V transmission voltage applied to the transmissive part should be dropped to 3.5V voltage, which is a reflection voltage to be applied to the reflective part. Accordingly, the 5V transmission voltage is charged in the transmissive part and the 3.5V reflection voltage is charged in the reflective part, so that an image with uniform white gradation may be displayed. Therefore, luminous intensity may be uniform in both the reflective and transmissive modes though a single cell-gap is embodied and a single voltage is applied.

Figure 2:
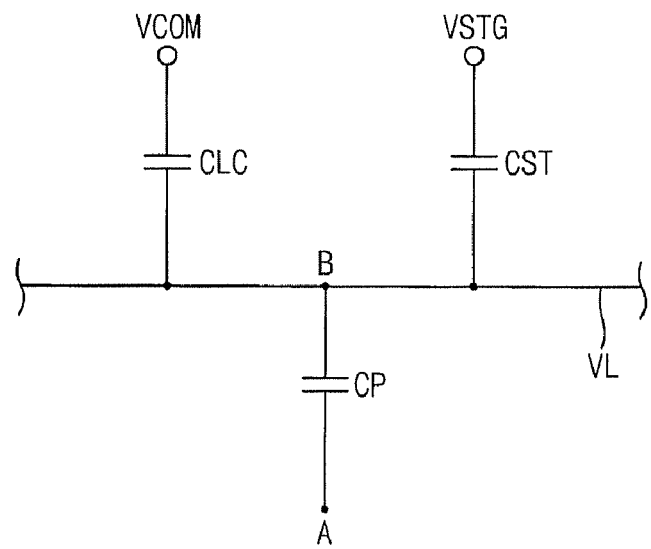
FIG. 2 is an equivalent circuit diagram of an exemplary circuit producing a reflection voltage according to an exemplary embodiment of the present invention.

FIG. 2 is an equivalent circuit diagram of an exemplary circuit producing a reflection voltage according to an exemplary embodiment of the present invention.

Referring to FIGS. 1B and 2, the equivalent circuit includes a first capacitor CLC, a second capacitor CST, and a third capacitor CP. The first capacitor CLC, such as a liquid crystal capacitor, includes a first end to which a first common voltage VCOM is applied and a second end electrically connected to a voltage line VL. The second capacitor CST, such as a storage capacitor, includes a first end to which a second common voltage VSTG is applied and a second end electrically connected to the voltage line VL. The third capacitor CP, such as a pumping capacitor, includes a first end electrically connected with a node 'A' and a second end electrically connected with a node 'B', which is the voltage line VL.

Hereinafter, an operation of the equivalent circuit will be described. First, the 5V transmission voltage is applied to each of the voltage line VL and the node 'A' so that the first to third capacitors are charged with the 5V transmission voltage. Next, 0V control voltage is applied to the node 'A' so that the voltage of the node 'A' is dropped from the 5V transmission voltage to the 0V control voltage. Accordingly, the voltage of the node 'B' is dropped by a predetermined voltage dependent on a voltage change ΔV2 of the node 'A' and a capacitance ratio of the first, second, and third capacitors CLC, CST and CP.

A voltage change ΔV1 of the node 'B' may be defined by the following equation.

$$\Delta V1 = \Delta V2 \times Q_{ratio}, \quad \text{[Equation 1]}$$
$$Q_{ratio} = \frac{C_P}{C_{LC} + C_P + C_{ST}}$$

In the Equation 1, "ΔV2" represents a voltage change of the node 'A'.

For example, when a capacitance ratio Qratio of the first, second, and third capacitors CLC, CST, and CP is about 0.3 and the voltage change ΔV2 of the node 'A' is about 5V, the voltage change ΔV1 of the node 'B' is about 1.5V (=0.3×5V). That is, when the voltage at node 'A' has dropped from the 5V transmission voltage to the 0V control voltage, the reflection voltage at node 'B' is about 3.5V because the voltage at node 'B' has dropped from about 5V to about 1.5V. Therefore, the 3.5V reflection voltage, which is induced by the capacitance ratio of the first, second, and third capacitors CLC, CST, and CP and a voltage difference between the transmission voltage and the control voltage, is applied to the first and second capacitors CLC and CST.

The following Table 1 shows a relationship between the transmission voltage and the reflection voltage in normally black mode.

TABLE 1

|  | Transmission voltage | Control voltage | Voltage change at node A | Voltage change at node B | Reflection voltage |
|---|---|---|---|---|---|
| Black | 0 V | 0 V | 0 V -> 0 V | 0 V -> 0 V | 0 V |
| White | 5 V | 0 V | 5 V -> 0 V | 5 V -> 1.5 V | 3.5 V |

Figure 3:
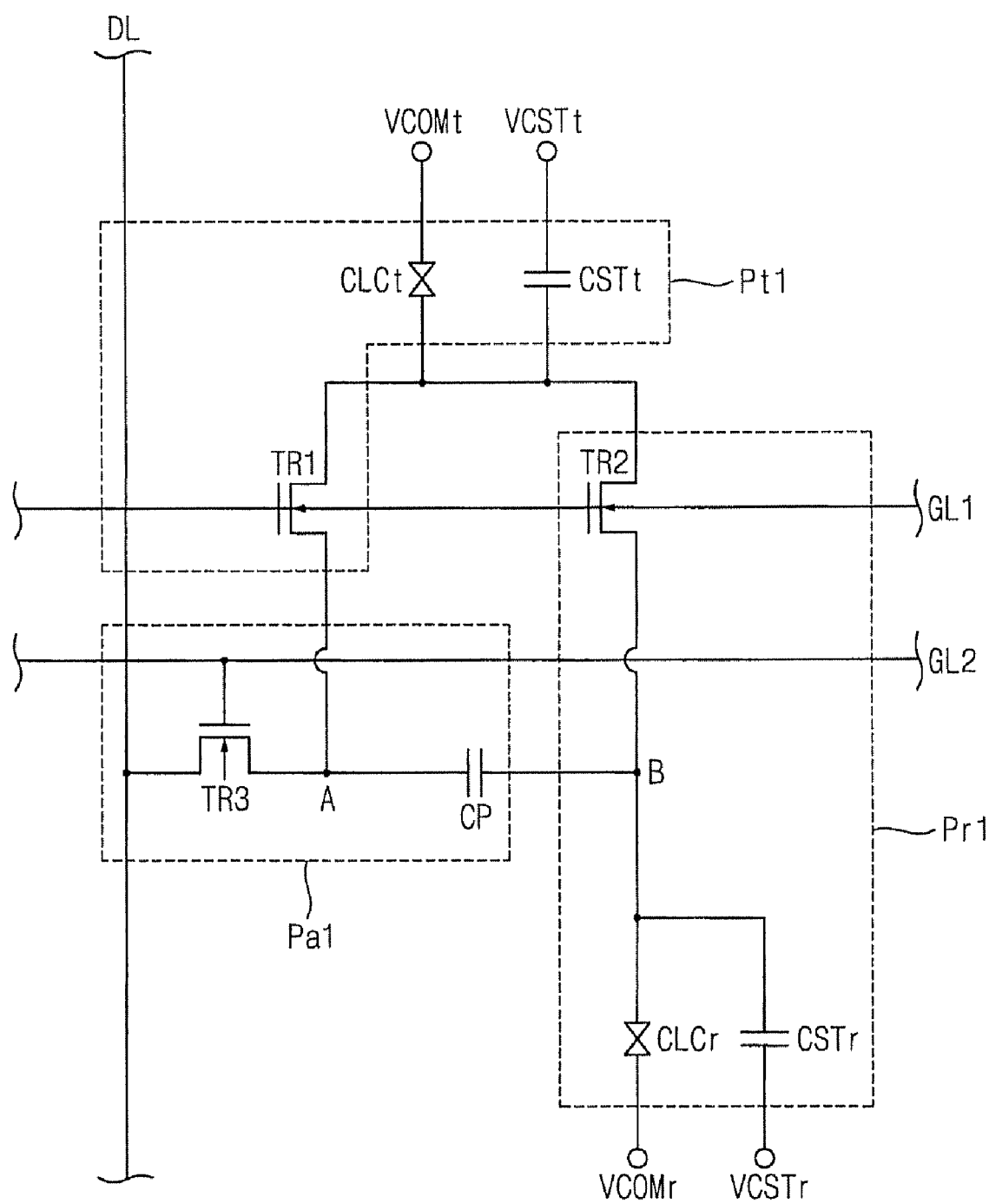
FIG. 3 is an equivalent circuit diagram of an exemplary pixel part according to a first exemplary embodiment of the present invention.

FIG. 3 is an equivalent circuit diagram of an exemplary pixel part according to a first exemplary embodiment of the present invention.

Referring to FIG. 3, a first pixel part P1 includes a first transmissive part Pt1, a first reflective part Pr1, and a first adjusting part Pa1. Driving signals are transmitted to the first pixel part P1 through a source line DL, a first gate line GL1, and a second gate line GL2. The first transmissive part Pt1, the first reflective part Pr1, and the first adjusting part Pa1 are driven by the driving signals.

The first transmissive part Pt1 includes a first transistor TR1, a first liquid crystal capacitor CLCt, and a first storage capacitor CSTt. The first transistor TR1 includes a first gate electrode, a first source electrode, and a first drain electrode. The first gate electrode is connected with the first gate line GL1. The first source electrode is electrically connected with a third transistor TR3 of the first adjusting part Pa1, as will be further described below. The first drain electrode is connected with the first liquid crystal capacitor CLCt and the first storage capacitor CSTt. The first liquid crystal capacitor CLCt includes a first electrode connected with the first drain electrode, and a second electrode to which a first common voltage VCOMt is applied. The first storage capacitor CSTt includes a first electrode connected with the first drain electrode, and a second electrode to which a second common voltage VCSTt is applied.

The first reflective part Pr1 includes a second transistor TR2, a second liquid crystal capacitor CLCr, and a second storage capacitor CSTr. The second transistor TR2 includes a second gate electrode, a second source electrode, and a second drain electrode. The second gate electrode is connected with the first gate line GL1. The second source electrode is connected with the first electrode of the first liquid crystal capacitor CLCt and the first electrode of the first storage capacitor CSTt. The second drain electrode is connected with the second liquid crystal capacitor CLCr and the second storage capacitor CSTr. The second liquid crystal capacitor CLCr includes a first electrode connected with the second drain electrode, and a second electrode to which a first common voltage VCOMr is applied, where VCOMr=VCOMt. The second storage capacitor CSTr includes a first electrode connected with the second drain electrode, and a second electrode to which a second common voltage VCSTr is applied, where VCSTr=VCSTt.

The first adjusting part Pa1 includes a third transistor TR3 and a pumping capacitor CP. The third transistor TR3 includes a third gate electrode, a third source electrode, and a third drain electrode. The third gate electrode is connected with the second gate line GL2. The third source electrode is connected with the source line DL. The third drain electrode is connected with a first electrode of the pumping capacitor CP. The pumping capacitor CP includes a first electrode connected with the third drain electrode, and a second electrode connected with the second drain electrode of the second transistor TR2.

Figure 4:
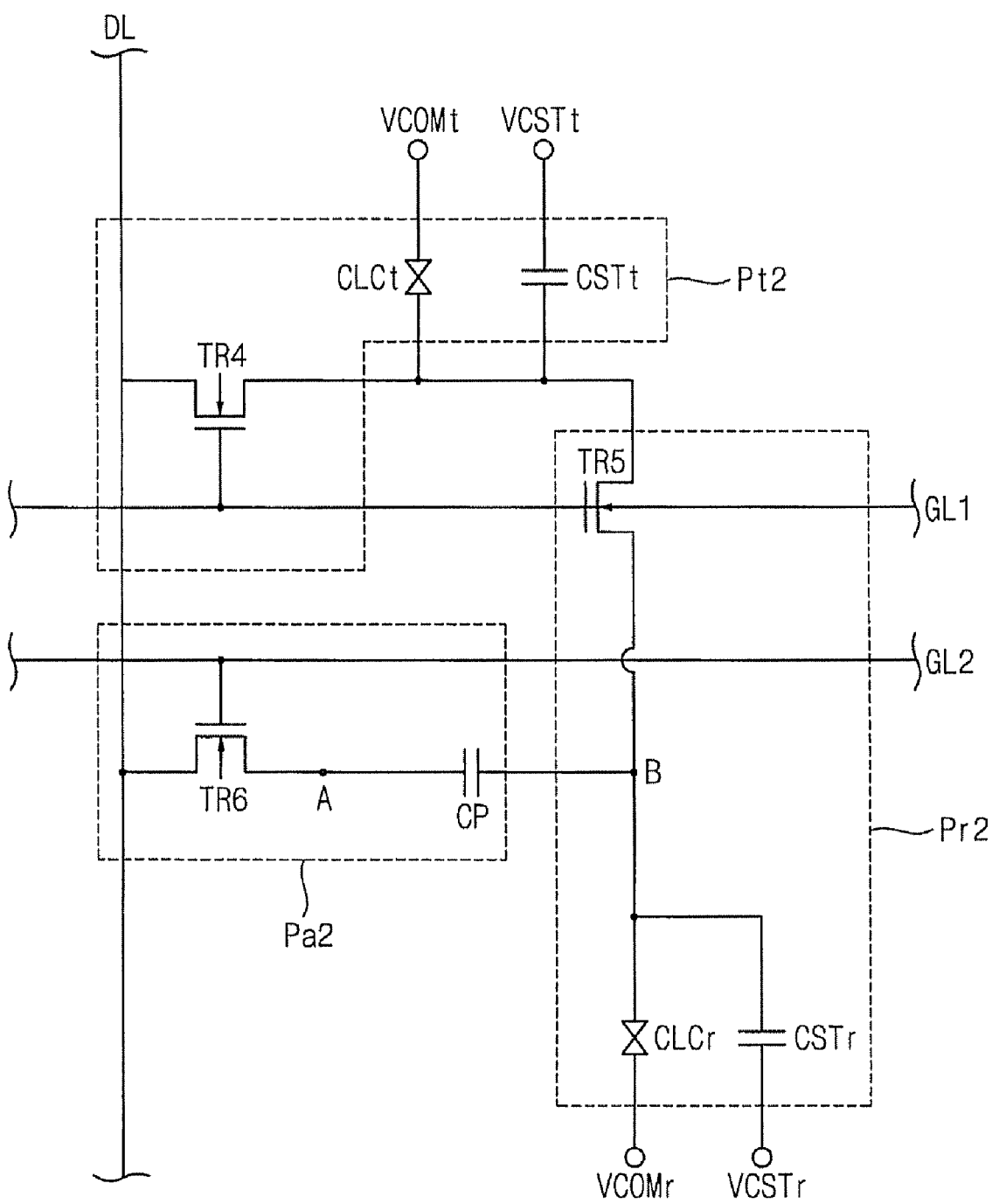
FIG. 4 is an equivalent circuit diagram of an exemplary pixel part according to a second exemplary embodiment of the present invention.

FIG. 4 is an equivalent circuit diagram of an exemplary pixel part according to a second exemplary embodiment of the present invention.

Referring to FIG. 4, a second pixel part P2 includes a second transmissive part Pt2, a second reflective part Pr2, and a second adjusting part Pa2. Driving signals are transmitted to the second pixel part P2 through a source line DL, a first gate line GL1, and a second gate line GL2. The second transmissive part Pt2, the second reflective part Pr2, and the second adjusting part Pa2 are driven by the driving signals.

The second pixel part P2 is similar to the first pixel part P1 according to the first exemplary embodiment illustrated in FIG. 3, but a connection manner of a fourth transistor TR4 of the second transmissive part Pt2 is different from that of the first pixel part P1. For example, the fourth transistor TR4 of the second transmissive part Pt2 includes a fourth gate electrode, a fourth source electrode, and a fourth drain electrode. The fourth gate electrode is connected with the first gate line GL1. The fourth source electrode is connected with the source line DL. The fourth drain electrode is connected with a first electrode of a first liquid crystal capacitor CLCt and a first electrode of a first storage capacitor CSTt.

The second reflective part Pr2 and the second adjusting part Pa2 of the second pixel part P2 may have substantially the same arrangement as that of the first reflective part Pr1 and the first adjusting part Pa1 of the first pixel part P1, except for the above-described connection manner. Therefore, details and repeated explanations will be omitted. In this case, a fifth transistor TR5 is substantially equivalent to the second transistor TR2 in FIG. 3, and a sixth transistor TR6 is substantially equivalent to the third transistor TR3 in FIG. 3.

Figure 5:
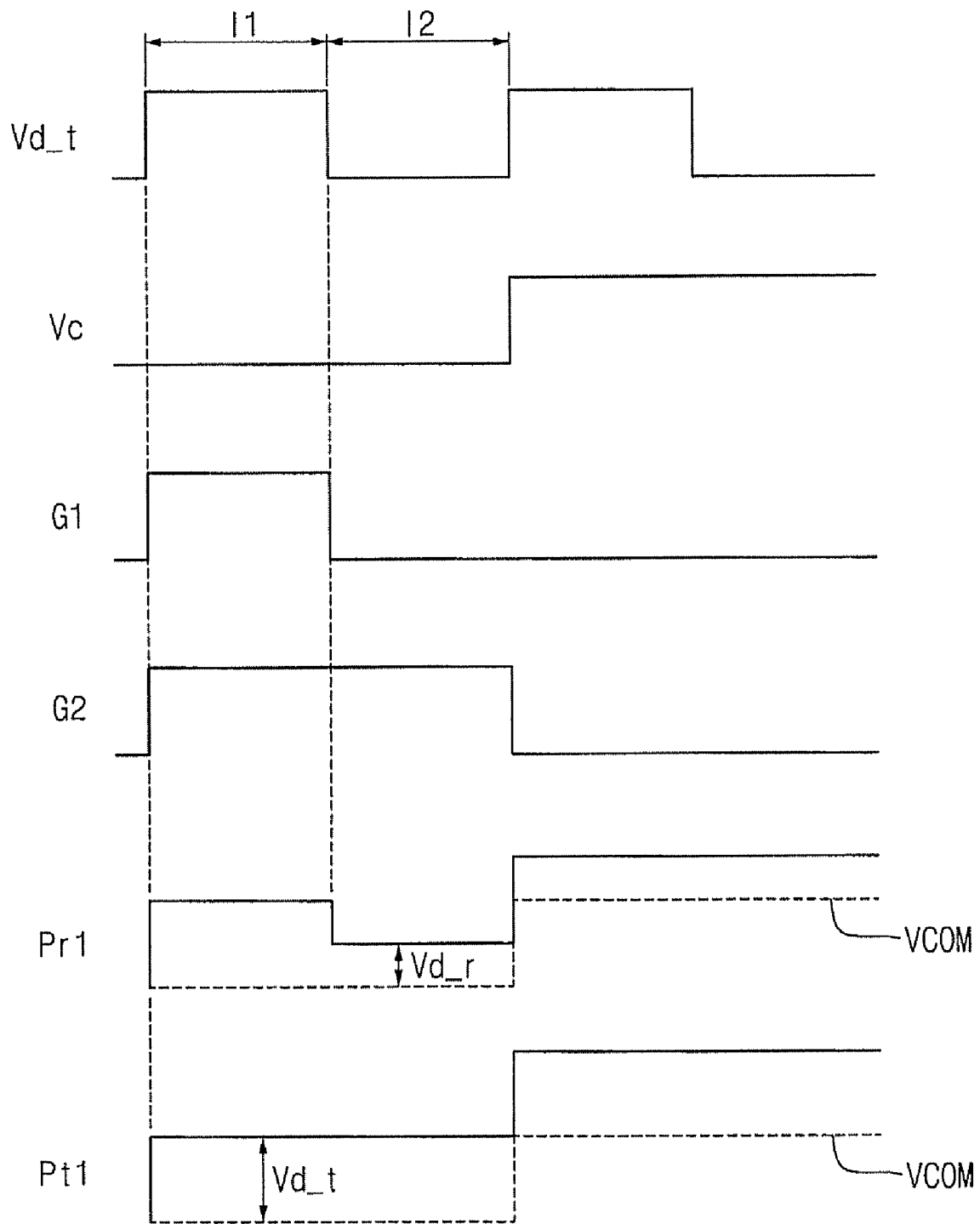
FIG. 5 is a timing diagram for describing an exemplary method of driving the exemplary equivalent circuit illustrated in FIG. 3.

FIG. 5 is a timing diagram for describing an exemplary method of driving the exemplary equivalent circuit illustrated in FIG. 3.

Referring to FIGS. 3 and 5, high level first and second gate signals G1 and G2 are applied to the first and second gate lines GL1 and GL2 during a first period I1. Accordingly, the first, second, and third transistors TR1, TR2, and TR3 are turned on, and a transmission voltage Vd_t is applied to the source line DL at this time. The transmission voltage Vd_t is charged in the first liquid crystal capacitor CLCt and the first storage capacitor CSTt via the third transistor TR3 and the first transistor TR1. The transmission voltage Vd_t is also applied to a node 'B', which is the second electrode of the pumping capacitor CP, via the second transistors TR2. Additionally, the transmission voltage Vd_t is applied to a node 'A', which is the first electrode of the pumping capacitor CP, via the third transistor TR3. Therefore, the transmission voltage Vd_t is applied to both of the first and second electrodes of the pumping capacitor CP.

During a second period I2, a low level first gate signal G1 is applied to the first gate line GL1, and the high level second gate signal G2 is maintained at the second gate line GL2. Accordingly, the first and second transistors TR1 and TR2, which have first and second gate electrodes connected to the first gate line GL1, are turned off, and the third transistor TR3 maintains a turn-on state. At this time, a control voltage Vc is applied to the source line DL. The control voltage Vc is applied to the node 'A', which is the first electrode of the pumping capacitor CP, via the turned-on third transistor TR3. A voltage of the node 'A' is adjusted from the transmission voltage Vd_t to the control voltage Vc. Correspondingly, a voltage of the node 'B', which is the second electrode of the pumping capacitor CP, is also adjusted from the transmission voltage Vd_t to a reflection voltage Vd_r.

In this case, the reflection voltage Vd_r that is applied to the node 'B' is adjusted by the voltage change $\Delta V1$ of the Equation 1 from the transmission voltage Vd_t. That is, the reflection voltage Vd_r is determined by a voltage difference of the node 'A' $\Delta Vd\_t$, which is a voltage difference between the transmission voltage Vd_t and the control voltage Vc, and a capacitance ratio Qratio of the pumping capacitor CP, the second liquid crystal capacitor CLCr, and the second storage capacitor CSTr, as previously described with respect to Equation 1.

Accordingly, the transmission voltage Vd_t is charged in the first liquid crystal capacitor CLCt and the first storage capacitor CSTt of the first transmissive part Pt1, and the reflection voltage Vd_r is charged in the second liquid crystal capacitor CLCr and the second storage capacitor CSTr of the first reflective part Pr1.

Figure 6:
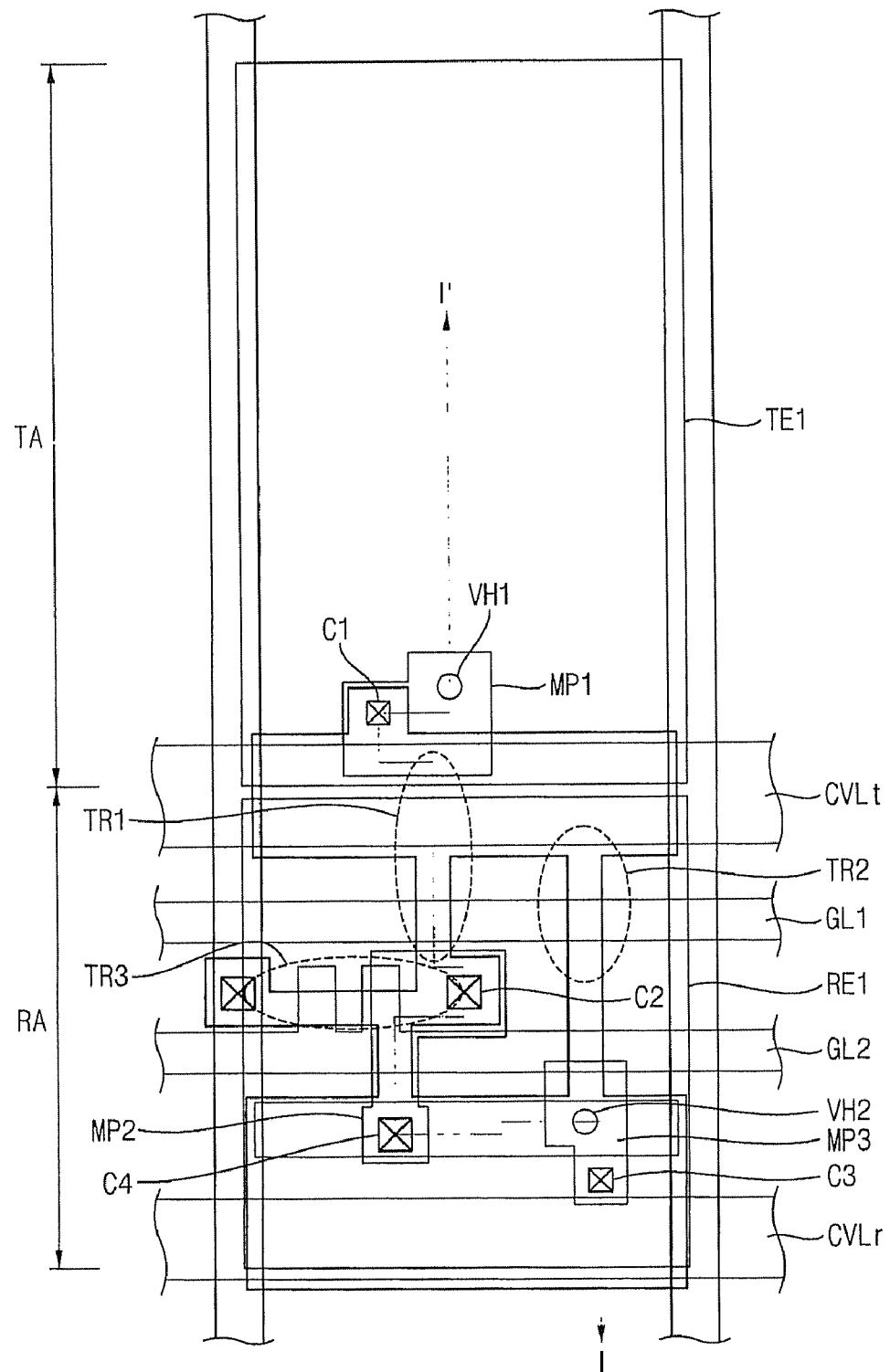
FIG. 6 is a plan view illustrating an exemplary first display substrate according to a third exemplary embodiment of the present invention.
Figure 7:
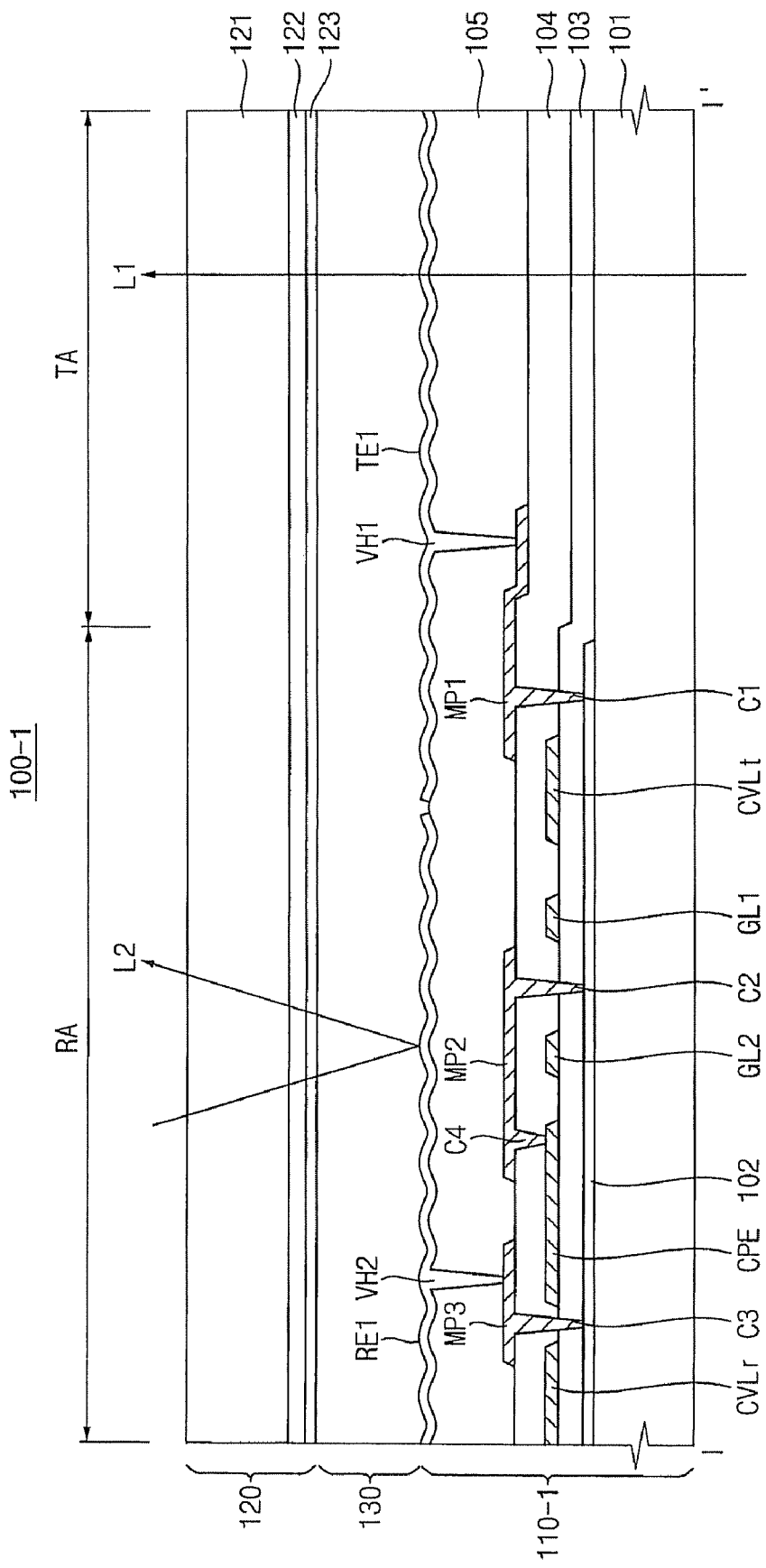
FIG. 7 is a cross-sectional view taken along line I-I' in FIG. 6.

FIG. 6 is a plan view illustrating an exemplary first display substrate according to a third exemplary embodiment of the present invention. FIG. 7 is a cross-sectional view taken along line I-I' in FIG. 6. FIGS. 8A to 8D are cross-sectional views describing an exemplary method of manufacturing the exemplary first display substrate in FIG. 6.

Referring to FIGS. 3, 6, and 7, a display panel 100-1 includes a first display substrate 110-1, a second display substrate 120, and a liquid crystal layer 130.

The first display substrate 110-1 includes source lines (also referred to as "data lines"), gate lines (also referred to as "scanning lines"), and common lines. The source lines are extended in a first direction. The gate lines and common lines are extended in a second direction intersecting with the first direction. The second direction may be substantially perpendicular to the first direction. The source lines, gate lines, and common lines define a plurality of pixel parts.

For example, each pixel part P1 includes a source line DL, and a first common line CVLt, a first gate line GL1, a second gate line GL2, and a second common line CVLr that respectively intersect with the source line DL. The pixel part P1 is divided into a transmissive area TA transmitting a first light L1 and a reflective area RA reflecting a second light L2. The reflective area RA includes the driving elements CLCt, CSTt, and TR1 of the first transmissive part Pt1, the driving elements CLCr, CSTr, and TR2 of the first reflective part Pr1, and the driving elements TR3 and CP of the first adjusting part Pa1 illustrated in FIG. 3.

Figure 8A:
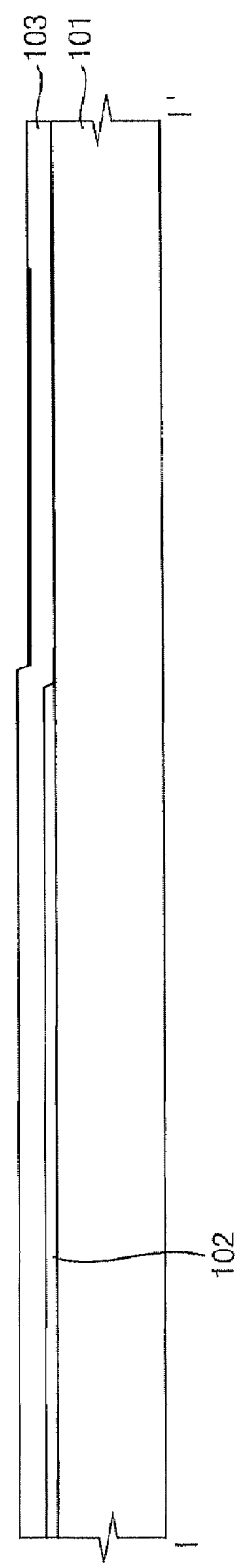

Referring to FIG. 8A, the first display substrate 110-1 includes a first base substrate 101. A channel pattern 102 is formed on the first base substrate 101 in the reflective area RA. The channel pattern 102 is formed at a region corresponding to the first, second, and third transistors TR1, TR2, and TR3. A first insulating interlayer 103 is formed on the base substrate 101 on which the channel pattern 102 is formed.

Referring to FIG. 8B, gate metal patterns are formed on the first insulating interlayer 103. The gate metal patterns include the first and second gate lines GL1 and GL2, the first and second common lines CVLt and CVLr, and an electrode pattern CPE that is a first electrode of the pumping capacitor CP.

The first storage capacitor CSTt of the first reflective part Pr1 is defined by the channel pattern 102, the first insulating interlayer 103 and the first common line CVLt. The second storage capacitor CSTr of the first reflective part Pr1 is defined by the channel pattern 102, the first insulating interlayer 103, and the second common line CVLr. The pumping capacitor CP of the first adjusting part Pa1 is defined by the channel pattern 102, the first insulating interlayer 103, and the electrode pattern CPE.

Figure 8C:
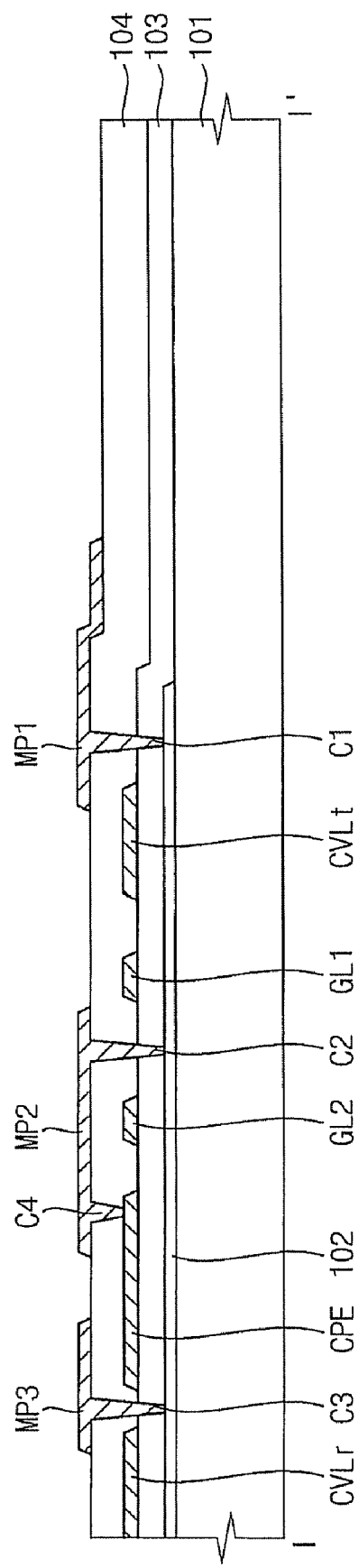

Referring to FIG. 8C, a second insulating interlayer 104 is formed on the base substrate 101 on which the gate metal patterns are formed. Source metal patterns are formed on the second insulating interlayer 104. The source metal patterns include the source line DL, and first, second, and third metal patterns MP1, MP2, and MP3 that form first, second, and third source electrodes and first, second, and third drain electrodes of the first, second, and third transistors TR1, TR2, and TR3 respectively.

The source line DL is integrally formed with the third source electrode of the third transistor TR3. The first source metal pattern MP1 includes the first drain electrode of the first transistor TR1 and the second source electrode of the second transistor TR2. The first source metal pattern MP1 is in contact with the channel pattern 102 through a first contact hole C1.

The second source metal pattern MP2 includes the first source electrode of the first transistor TR1 and the third drain electrode of the third transistor TR3. The second source metal pattern MP2 is in contact with the channel pattern 102 through a second contact hole C2, and is in contact with the electrode pattern CPE of the pumping capacitor CP through a fourth contact hole C4. Accordingly, the pumping capacitor CP is defined by the channel pattern 102, the first insulating interlayer 103 and the electrode pattern CPE.

The third source metal pattern MP3 includes the second drain electrode of the second transistor TR2. The third source metal pattern MP3 is in contact with the channel pattern 102 through a third contact hole C3.

Figure 8D:
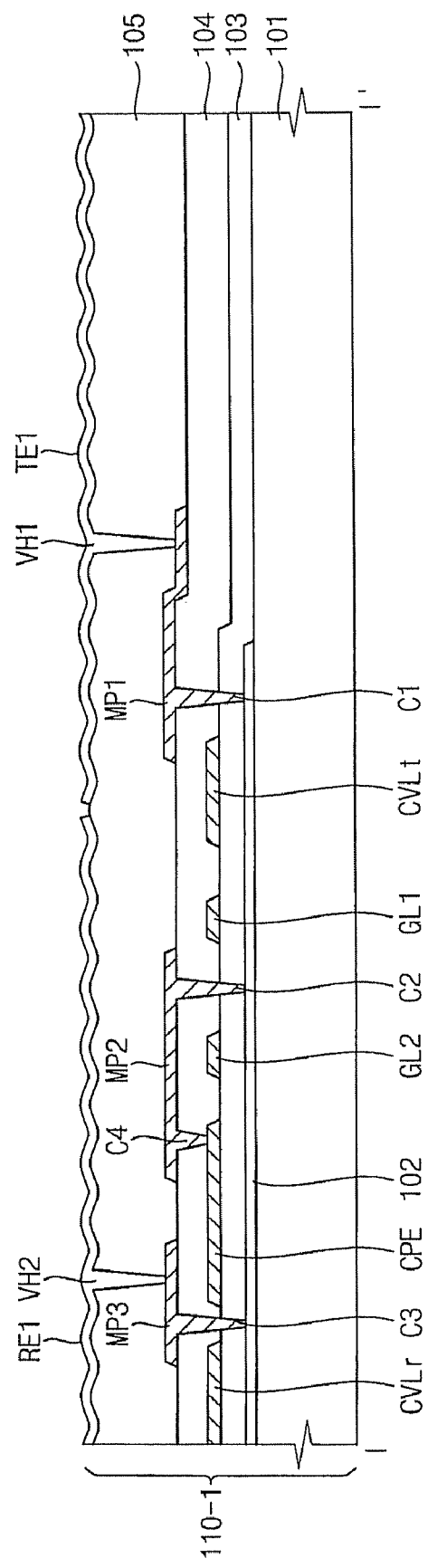

Referring to FIG. 8D, an organic insulating layer 105 is formed on the base substrate 101 on which the source metal patterns are formed. The organic insulating layer 105 is formed with a uniform thickness in both the reflective area RA and the transmissive area TA. An embossing pattern may be formed at a surface of the organic insulating layer 105. Accordingly, the display panel 100-1 has a uniform cell gap in both the reflective area RA and the transmissive area TA.

A pixel electrode is formed on the organic insulating layer 105 corresponding to the pixel part P1. The pixel electrode includes a transparent electrode TE1 and a reflective electrode RE1. The transparent electrode TE1 is formed in the transmissive area TA, and transmits the first light L1 incident from a rear of the first display substrate 110-1. The reflective electrode RE1 is formed in the reflective area RA, and reflects the second light L2 incident from a front of the first display substrate 110-1.

The transparent electrode TE1 is in contact with the first source metal pattern MP1 through a first via-hole VH1. The transparent electrode TE1 is electrically connected with the first drain electrode of the first transistor TR1, and defines a first electrode of the first liquid crystal, capacitor CLCt. The reflective electrode RE1 is in contact with the third source metal pattern MP3 through a second via-hole VH2. The reflective electrode RE1 is electrically connected with the second drain electrode of the second transistor TR2, and defines a first electrode of the second liquid crystal capacitor CLCr.

Referring back to FIG. 7, the second display substrate 120 includes a second base substrate 121. A color filter layer 122 and a common electrode layer 123 are formed on the second base substrate 121.

The color filter layer 122 is formed in the pixel part, and includes red, green and blue color patterns. Though not illustrated, a light hole may be formed in the color filter layer 122 corresponding to a predetermined region of the reflective area RA. The light hole transmits the second light L2, and thus unifies luminance of the reflective area RA and the transmissive area TA.

The common electrode layer 123 is opposite to the transparent electrode TE1 and the reflective electrode RE1 that are formed on the first display substrate 110-1. The common electrode layer 123 is equivalent to the common electrode and defines a second electrode of the first and second liquid crystal capacitors CLCt and CLCr.

The liquid crystal layer 130 includes a plurality of liquid crystal molecules. An alignment angle of the liquid crystal molecules is changed by an electric potential difference between the pixel electrodes RE1 and TE1 of the first display substrate 110-1 and the common electrode layer 123 of the second display substrate 120, so that a gradational image is displayed. The liquid crystal layer 130 may have a normally black mode or a normally white mode. As the electric potential difference is larger, the luminance of the displayed gradation is higher in the normally black mode. On the contrary, as the electric potential difference is smaller, the luminance of the displayed gradation is higher in the normally white mode.

Figure 9:
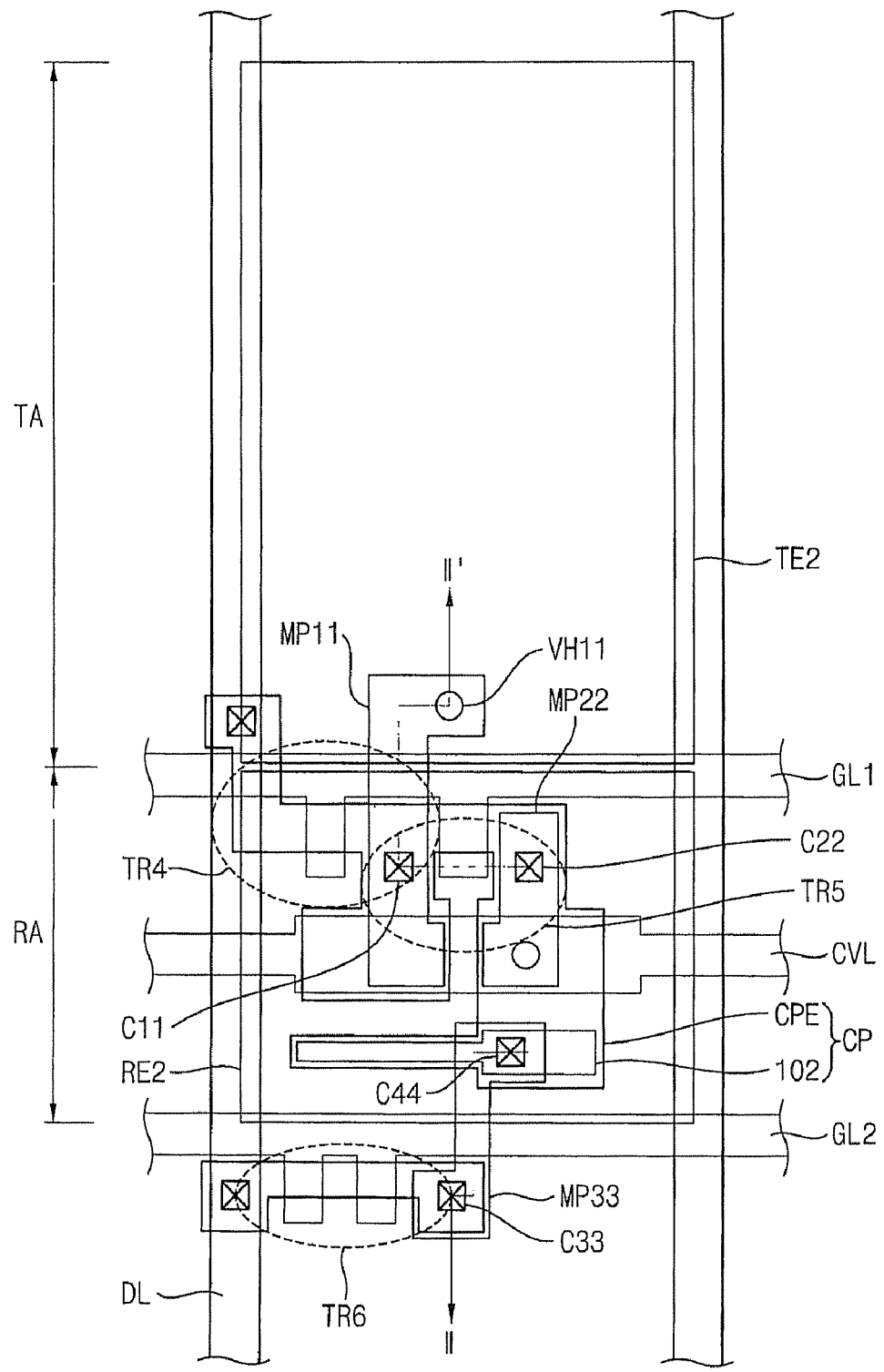
FIG. 9 is a plan view illustrating an exemplary first display substrate according to a fourth exemplary embodiment of the present invention.
Figure 10:
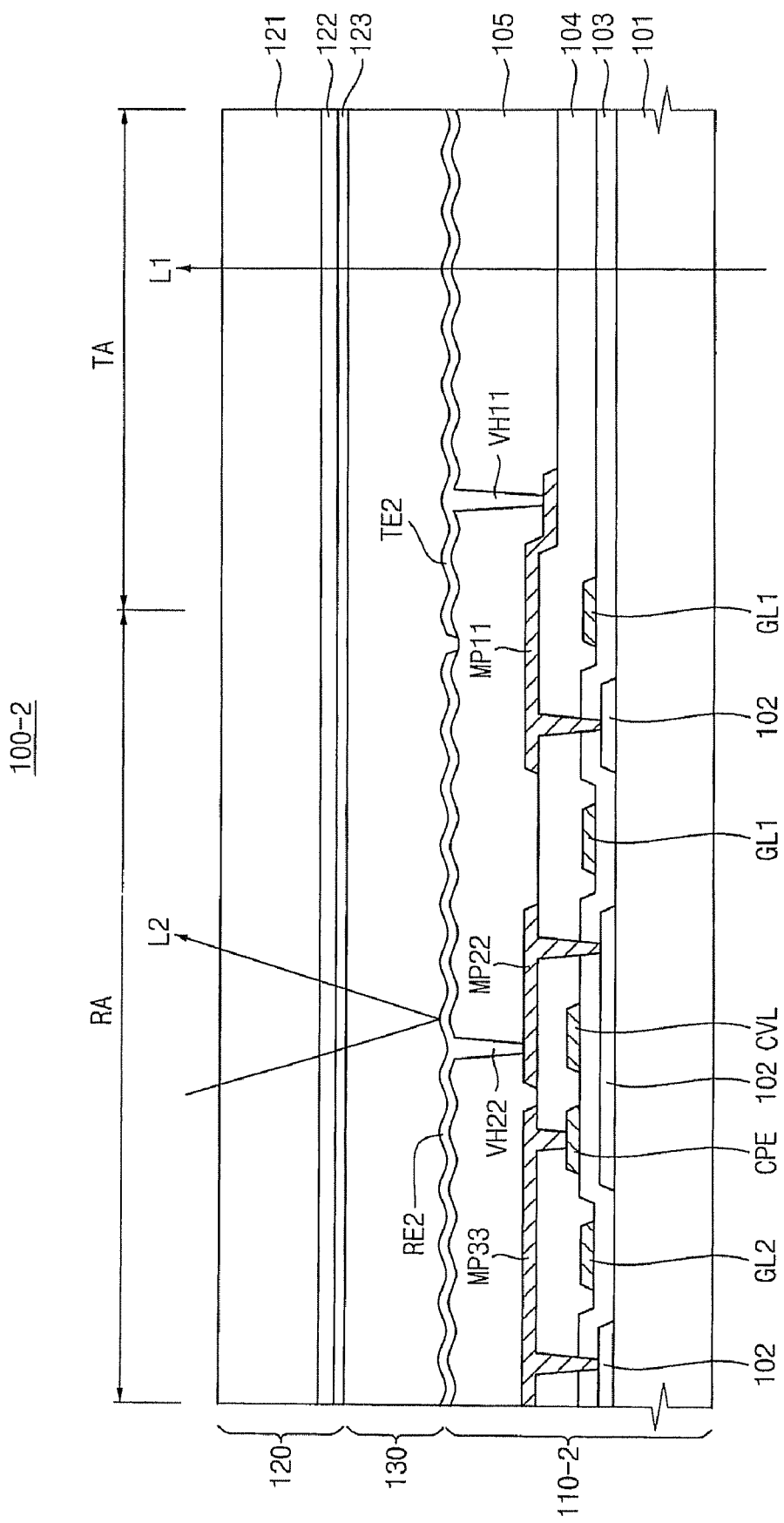
FIG. 10 is a cross-sectional view taken along line II-II' in FIG. 9.

FIG. 9 is a plan view illustrating an exemplary first display substrate according to a fourth exemplary embodiment of the present invention. FIG. 10 is a cross-sectional view taken along line II-II' in FIG. 9.

Referring to FIGS. 4, 9, and 10, a display panel 100-2 includes a first display substrate 110-2, a second display substrate 120, and a liquid crystal layer 130.

The first display substrate 110-2 includes source lines, gate lines, and a common line. The source lines are extended in a first direction. The gate lines and the common line are extended in a second direction intersecting with the first direction. The second direction may be substantially perpendicular to the first direction. The source lines, gate lines, and common line define a plurality of pixel parts.

For example, each pixel part P2 includes a source line DL, and a common line CVL, a first gate line GL1, and a second gate line GL2 that respectively intersect with the source line DL. The pixel part P2 is divided into a transmissive area TA transmitting a first light L1 and a reflective area RA reflecting a second light L2. The reflective area RA includes the driving elements CLCt, CSTt, and TR4 of the second transmissive part Pt2, the driving elements CLCr, CSTr, and TR5 of the second reflective part Pr2, and the driving elements TR6 and CP of the second adjusting part Pa2 illustrated in FIG. 4.

The first display substrate 110-2 includes a first base substrate 101. A channel pattern 102 is formed on the first base substrate 101 in the pixel part P2. The channel pattern 102 is formed at a region corresponding to the fourth, fifth, and sixth transistors TR4, TR5, and TR6.

A first insulating interlayer 103 is formed on the base substrate 101 on which the channel pattern 102 is formed. Gate metal patterns are formed on the first insulating interlayer 103. The gate metal patterns include the common line CVL, the first and second gate lines GL1 and GL2, and an electrode pattern CPE that is a first electrode of the pumping capacitor CP.

A second insulating interlayer 104 is formed on the base substrate 101 on which the gate metal patterns are formed. Source metal patterns are formed on the second insulating interlayer 104. The source metal patterns include the source line DL, and first, second, and third metal patterns MP11, MP22, and MP33 that form fourth, fifth, and sixth source electrodes and fourth, fifth, and sixth drain electrodes of the fourth, fifth, and sixth transistors TR4, TR5, and TR6 respectively.

The source line DL is integrally formed with the fourth source electrode of the fourth transistor TR4 and the sixth source electrode of the sixth transistor TR6. The first source metal pattern MP11 includes the fourth drain electrode of the fourth transistor TR4 and the fifth source electrode of the fifth transistor TR5. The first source metal pattern MP11 is in contact with the channel pattern 102 through a first contact hole C11.

The second source metal pattern MP22 includes the fifth drain electrode of the fifth transistor TR5, and is in contact with the channel pattern 102 through a second contact hole C22.

The third source metal pattern MP33 includes the sixth drain electrode of the sixth transistor TR6. The third source metal pattern MP33 is in contact with the channel pattern 102 through a third contact hole C33, and is in contact with the electrode pattern CPE of the pumping capacitor CP through a fourth contact hole C44.

Accordingly, the first storage capacitor CSTt of the second transmissive part Pt2 is defined in a region where the first source metal pattern MP11 and the common line CVL overlap with each other, and the second storage capacitor CSTr of the second reflective part Pr2 is defined in a region where the second source metal pattern MP22 and the common line CVL overlap with each other. The pumping capacitor CP of the second adjusting part Pa2 is defined by the channel pattern 102 and the electrode pattern CPE.

An organic insulating layer 105 is formed on the first base substrate 101 on which the source metal patterns are formed. The organic insulating layer 105 is formed with a uniform thickness in both the reflective area RA and the transmissive area TA. An embossing pattern may be formed at a surface of the organic insulating layer 105. Accordingly, the display panel 100-2 has a uniform cell gap in both the reflective area RA and the transmissive area TA.

A pixel electrode is formed on the organic insulating layer 105 corresponding to the pixel part P2. The pixel electrode includes a transparent electrode TE2 and a reflective electrode RE2. The transparent electrode TE2 is formed in the transmissive area TA, and the reflective electrode RE2 is formed in the reflective area RA.

The transparent electrode TE2 is in contact with the first source metal pattern MP11 through a first via-hole VH11. Accordingly, the transparent electrode TE2 is electrically connected with the fourth drain electrode of the fourth transistor TR4, and defines a first electrode of the first liquid crystal capacitor CLCt. The reflective electrode RE2 is in contact with the second source metal pattern MP22 through a second via-hole VH22. Accordingly, the reflective electrode RE2 is electrically connected with the fifth drain electrode of the fifth transistor TR5, and defines a first electrode of the second liquid crystal capacitor CLCr.

The second display substrate 120 and the liquid crystal layer 130 are substantially the same as those illustrated in FIG. 7, and thus details and repeated explanations will be omitted.

Figure 11:
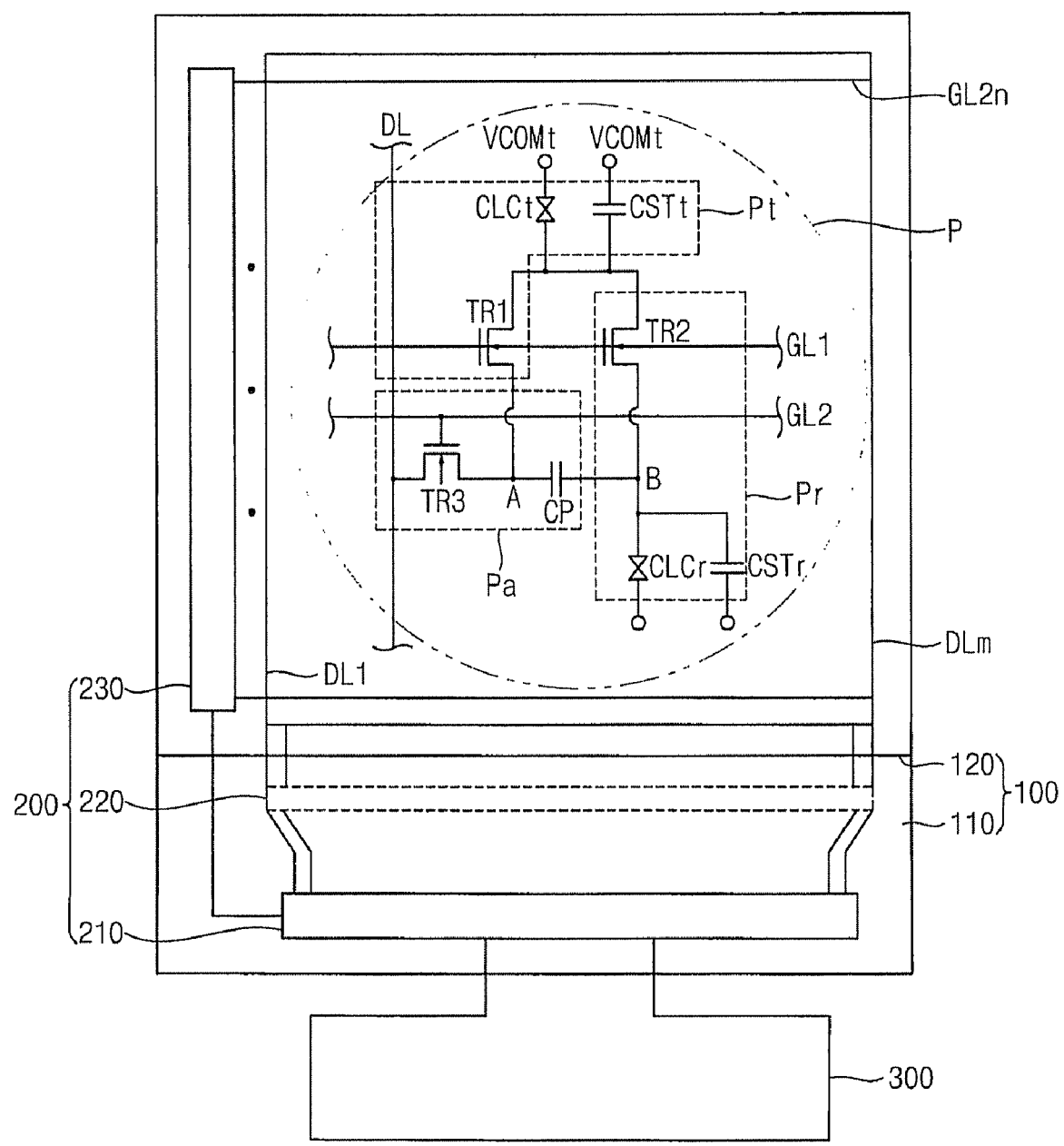
FIG. 11 is a block diagram illustrating an exemplary display device according to a fifth exemplary embodiment of the present invention.

FIG. 11 is a block diagram illustrating an exemplary display device according to a fifth exemplary embodiment of the present invention.

Referring to FIG. 11, the display device includes a liquid crystal display ("LCD") panel 100, a driving device 200, and a flexible printed circuit board ("FPC") 300. The FPC 300 electrically connects the driving device 200 with an external device (not shown).

The LCD panel 100 includes a first display substrate 110, a second display substrate 120, and a liquid crystal layer (not shown) interposed between the display substrates 110 and 120. The LCD panel 100 includes a display area and a peripheral area surrounding the display area.

The display area includes 'm' source lines DL1, . . . , DLm and 2n gate lines GL1, . . . , GL2n. The gate lines GL1, . . . , GL2n intersect with the source lines DL1, DLm. The source lines DL1, . . . , DLm and gate lines GL1, . . . , GL2n define m×n pixel parts 'P' in the display area. Herein, 'n' and 'm' represent natural numbers.

The pixel part 'P' includes a transmissive part Pt, a reflective part Pr, and an adjusting part Pa. Driving signals are transmitted to the pixel part 'P' through a source line DL, a first gate line GL1, and a second gate line GL2. The transmissive part Pt, the reflective part Pr, and the adjusting part Pa are driven by the driving signals. The transmissive part Pt includes a first transistor TR1, a first liquid crystal capacitor CLCt, and a first storage capacitor CSTt. The reflective part Pr includes a second transistor TR2, a second liquid crystal capacitor CLCr, and a second storage capacitor CSTr. The adjusting part Pa includes a third transistor TR3 and a pumping capacitor CP.

The driving device 200 includes a main driving part 210, an output selecting part 220, and a gate driving part 230.

The main driving part 210 may be a single chip mounted in the peripheral area. The main driving part 210 outputs driving signals for driving the pixel part 'P' by using a control signal and a data signal transmitted from the FPC 300.

The output selecting part 220 selectively outputs a data voltage and a control voltage Vc, which are output signals outputted from the main driving part 210, to the source line DL. In this case, the data voltage is a transmission voltage Vd_t charged in the first liquid crystal capacitor CLCt and the first storage capacitor CSTt of the transmissive part Pt. The control voltage Vc is a preset voltage for adjusting the transmission voltage Vd_t to a reflection voltage Vd_r. The output selecting part 220 outputs the transmission voltage Vd_t to the source line DL during a first period of a horizontal period, and outputs the control voltage Vc to the source line DL during a second period of a horizontal period.

The gate driving part 230 may be integrated in the peripheral area, or may be mounted as a separate chip. The gate driving part 230 outputs gate signals to the gate lines GL1, ..., GL2n on the basis of the driving signal provided from the main driving part 210.

Figure 12:
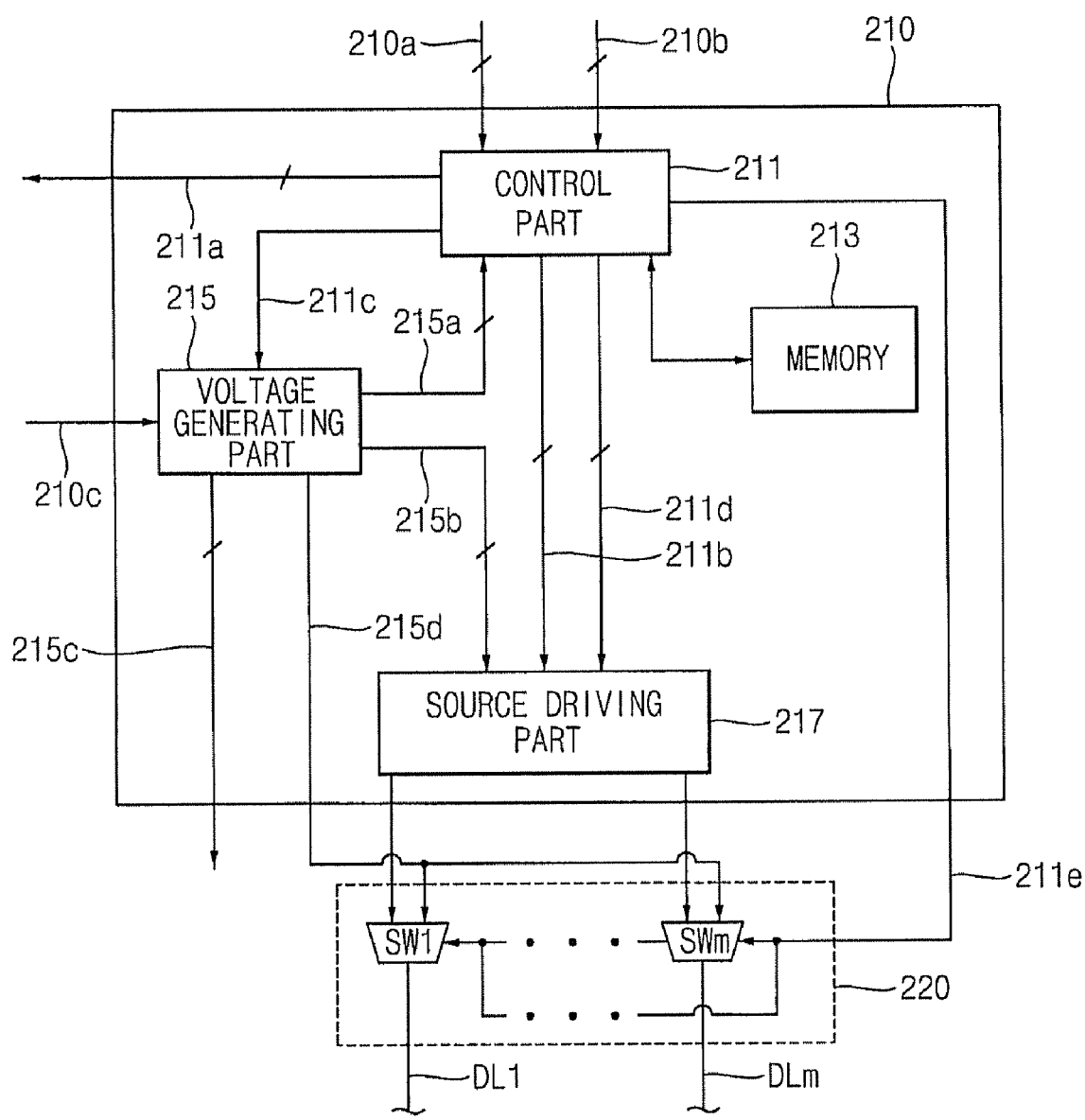
FIG. 12 is a block diagram illustrating the exemplary main driving part and the exemplary output selecting part in FIG. 11.

FIG. 12 is a block diagram illustrating the exemplary main driving part and the exemplary output selecting part in FIG. 11.

Referring to FIGS. 11 and 12, the main driving part 210 includes a control part 211, a memory 213, a voltage generating part 215, and a source driving part 217.

The control part 211 receives a data signal 210a and a control signal 210b from an exterior. The control signal 210b includes a horizontal synchronization signal, a vertical synchronization signal, a main clock signal, and a data enable signal.

The control part 211 writes and reads out the data signal 210a to/from the memory 213 on the basis of the control signal 210b. The control part 211 outputs a gate control signal 211a to the gate driving part 230. The gate control signal 211a includes a vertical starting signal STV, a first clock signal CK, a second clock signal CKB, and a gate voltage VSS.

The control part 211 also outputs a source signal 211b to the source driving part 217, and outputs a data signal 211d read out from the memory 213 to the source driving part 217. The source signal 211b includes a horizontal starting signal, a load signal, and a reverse signal.

The control part 211 further outputs a control signal 211c such as a main clock signal, a reverse signal, etc. to the voltage generating part 215. The control part 211 additionally outputs a selecting signal 211e to the output selecting part 220.

The voltage generating part 215 generates driving voltages by using an external power source 210c applied from an exterior. The driving voltages include gate voltages 215a, reference gamma voltages 215b, and common voltages 215c.

The gate voltages 215a are provided to the control part 211, and the reference gamma voltages 215b are provided to the source driving part 217. The common voltages 215c are provided to the LCD panel 100. The common voltages 215c include liquid crystal common voltages VCOMt and VCOMr, and storage voltages VSTGt and VSTGr. The liquid crystal common voltages VCOMt and VCOMr are applied to a common electrode of the second display substrate 120. The storage voltages VSTGt and VSTGr are applied to a common electrode of the first display substrate 110. The liquid crystal common voltages VCOMt and VCOMr and the storage voltages VSTGt and VSTGr may have substantially the same level, for example VCOMt=VCOMr=VSTGt=VSTGr.

In addition to the driving voltages, the voltage generating part 215 outputs a control voltage 215d, that is Vc for adjusting the transmission voltage Vd_t to a reflection voltage Vd_r, to the output selecting part 220.

The control voltage Vc is set up dependent on T-V and R-V characteristics of the LCD panel 100, and a capacitance ratio Qratio of the second liquid crystal capacitor CLCr, the second storage capacitor CSTr, and a pumping capacitor CP of the pixel part 'P'. In this exemplary embodiment, a case wherein the control voltage Vc has the same level as the common voltages will be taken as an example.

The source driving part 217 converts the data signal 211d read out from the memory 213 to analog data voltages on the basis of the reference gamma voltages 215b, and outputs the analog data voltages to the output selecting part 220 formed at the first display substrate 110. In this case, the data voltage outputted from the source driving part 217 is the transmission voltage Vd_t that is to be charged in the transmissive part Pt of the corresponding pixel part 'P'.

The output selecting part 220 includes a plurality of switches SW1, ..., SWm corresponding to the number of output terminals of the source driving part 217. Each of the switches SW1, ... SWm has a first input terminal connected with the output terminal of the source driving part 217, and a second input terminal through which the control voltage 215d (Vc) provided from the voltage generating part 215 is inputted. Each switch, for example switch SW1, selects one voltage between the transmission voltage Vd_t inputted through the first input terminal and the control voltage Vc inputted through the second input terminal, and outputs the selected voltage to the corresponding source line DL.

Figure 13:
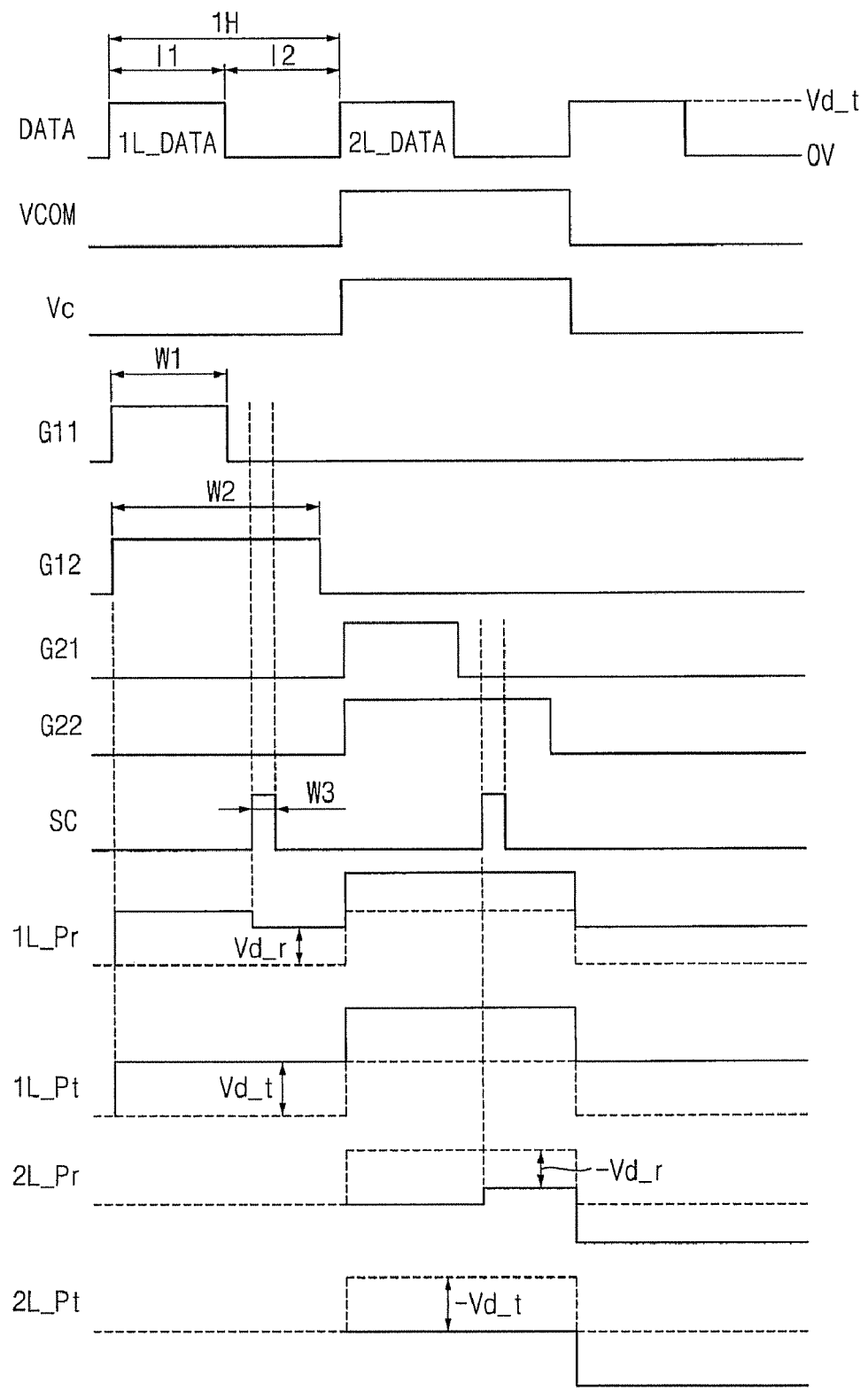
FIG. 13 is a timing diagram for describing an exemplary method of driving an exemplary display device according to a sixth exemplary embodiment of the present invention.

FIG. 13 is a timing diagram for describing an exemplary method of driving an exemplary display device according to a sixth exemplary embodiment of the present invention.

Referring to FIGS. 11, 12, and 13, the voltage generating part 215 outputs a common voltage 215c VCOM to an LCD panel 100. The common voltage 215c VCOM is substantially the same as common voltages of a first liquid crystal capacitor, a second liquid crystal capacitor, a first storage capacitor, and a second storage capacitor, i.e. VCOM=VCOMt=VCOMr=VSTGt=VSTGr. The common voltage VCOM is reversed in every horizontal period 1H according to a line inversion method.

The voltage generating part 215 outputs a control voltage 215d Vc to the output selecting part 220. In this exemplary embodiment, a case wherein the control voltage Vc has the same level as the common voltage VCOM will be taken as an example. The source driving part 217 outputs a data voltage DATA corresponding to one horizontal line during a first period I1 of the horizontal period 1H.

The gate driving part 230 outputs first and second gate signals G11 and G12 to the first and second gate lines GL1 and GL2 to drive the corresponding pixel parts of the horizontal line. The first gate signal G11 has a first pulse width W1 corresponding to the first period I1. The second gate signal G12 is synchronized with a rising edge of the first gate signal G11 and thus also rises in the first period I1. The second gate signal G12 has a second pulse width W2 that is larger than the first pulse width W1. The second pulse width W2 may last for the duration of the horizontal period 1H.

The control part 211 outputs a selecting signal 211e SC for controlling the output selecting part 220, corresponding to the first and second gate signals G11 and G12. On the basis of the selecting signal SC, the output selecting part 220 selects the output signal of the source driving part 217 in a period while the first and second gate signals G11 and G12 are in a high level, and selects the control voltage Vc in a period while the first gate signal G11 is in a low level and the second gate signal G12 is in a high level.

For example, during the first period I1 of the first horizontal period 1H, the gate driving part 230 outputs high level first and second gate signals G11 and G12 to the first and second gate lines GL1 and GL2 formed in pixel parts of a first horizontal line. The output selecting part 220 outputs a data voltage 1L_DATA of the first horizontal line, which is the output signal of the source driving part 217, to the source lines DL1, ..., DLm on the basis of the selecting signal 211e SC during the first period I1.

The data voltage Vd_t applied to an arbitrary source line DL is charged in the first liquid crystal capacitor CLCt and the first storage capacitor CSTt via the third transistor TR3 and the first transistor TR1 respectively, and is applied to a node 'B', which is a second electrode of the pumping capacitor CP, via the second transistor TR2. The data voltage Vd_t is applied to a node 'A', which is a first electrode of the pumping capacitor CP, via the third transistor TR3. Accordingly, the data voltage Vd_t is applied to both of the first and second electrodes of the pumping capacitor CP.

During a second period I2 of the first horizontal period 1H, the gate driving part 230 outputs a low level first gate signal G11 to the first gate line GL1, and maintains the high level second gate signal G12 at the second gate line GL2. In this case, the output selecting part 220 outputs the control voltage 215d Vc, which is the output signal of the voltage generating part 215, to the source lines DL1, ..., DLm on the basis of the selecting signal 211e SC from the control part 211.

Accordingly, the control voltage 215d Vc applied to an arbitrary source line DL is applied to the node 'A', which is the first electrode of the pumping capacitor CP, via the third transistor TR3. The voltage of the node 'A' drops from the data voltage Vd_t to the control voltage Vc, and the voltage of the node 'B', which is the second electrode of the pumping capacitor CP, also drops correspondingly.

The voltage of the node 'B' is the reflection voltage Vd_r adjusted by the voltage change Vd_t-Vc of the node 'A' and the capacitance ratio Qratio of the pumping capacitor CP, the second liquid crystal capacitor CLCr, and the second storage capacitor CSTr, according to Equation 1. Accordingly, the reflection voltage Vd_r is charged in the second liquid crystal capacitor CLCr and the second storage capacitor CSTr. Therefore, the data voltage Vd_t is charged in a transmissive part 1L_Pt of the first horizontal line, and the reflection voltage Vd_r is charged in a reflective part 1L_Pr of the first horizontal line.

In the same manner, pixel parts of a second horizontal line are driven during a second horizontal period. Accordingly, a data voltage -Vd_t is charged in a transmissive part 2L_Pt of the second horizontal line, and a reflection voltage -Vd_r is charged in a reflective part 2L_Pr of the second horizontal line.

Figure 14:
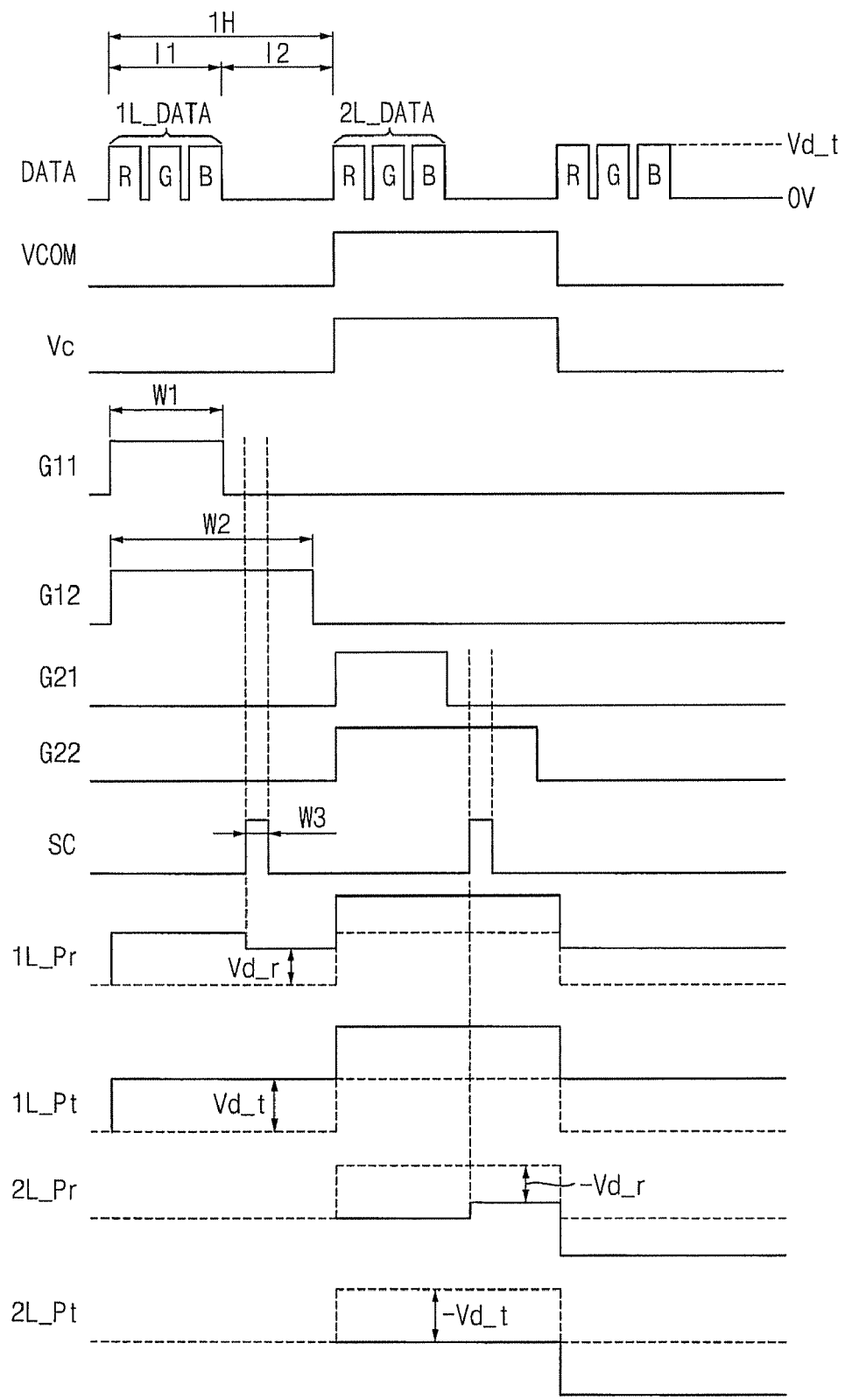
FIG. 14 is a timing diagram for describing an exemplary method of driving an exemplary display device according to a seventh exemplary embodiment of the present invention.

FIG. 14 is a timing diagram describing an exemplary method of driving an exemplary display device according to a seventh exemplary embodiment of the present invention.

Referring to FIGS. 11, 12 and 14, during a horizontal period 1H, the source driving part 217 sequentially outputs a first color data voltage 'R', a second color data voltage 'G', and a third color data voltage 'B' corresponding to pixel parts of first color 'R', second color 'G', and third color 'B' respectively, which constitute one horizontal line.

For example, during a first period I1 of the first horizontal period 1H, the gate driving part 230 outputs high level first and second gate signals G11 and G12 to the first and second gate lines GL1 and GL2 formed in pixel parts of a first horizontal line. The output selecting part 220 outputs the first, second, and third data voltages 'R', 'G' and 'B', which are the output signal 1L_DATA of the source driving part 217, to source lines (DL1, ..., DLm) on the basis of the selecting signal 211e SC during the first period I1. Accordingly, a transmission voltage Vd_t is charged in the first liquid crystal capacitor CLCt and the first storage capacitor CSTt that constitute a transmissive part 1L_Pt of the first horizontal line.

Then, during a second period I2 of the first horizontal period 1H, the gate driving part 230 outputs a low level first gate signal G11 to the first gate line GL1, and maintains the high level second gate signal G12 at the second gate line GL2. The output selecting part 220 outputs the control voltage 215d Vc to the source lines DL1, ..., DLm on the basis of the selecting signal 211e SC. Accordingly, a reflection voltage Vd_r is charged in the second liquid crystal capacitor CLCr and the second storage capacitor CSTr that constitute a reflective part 1L_Pr of the first horizontal line.

Figure 15:
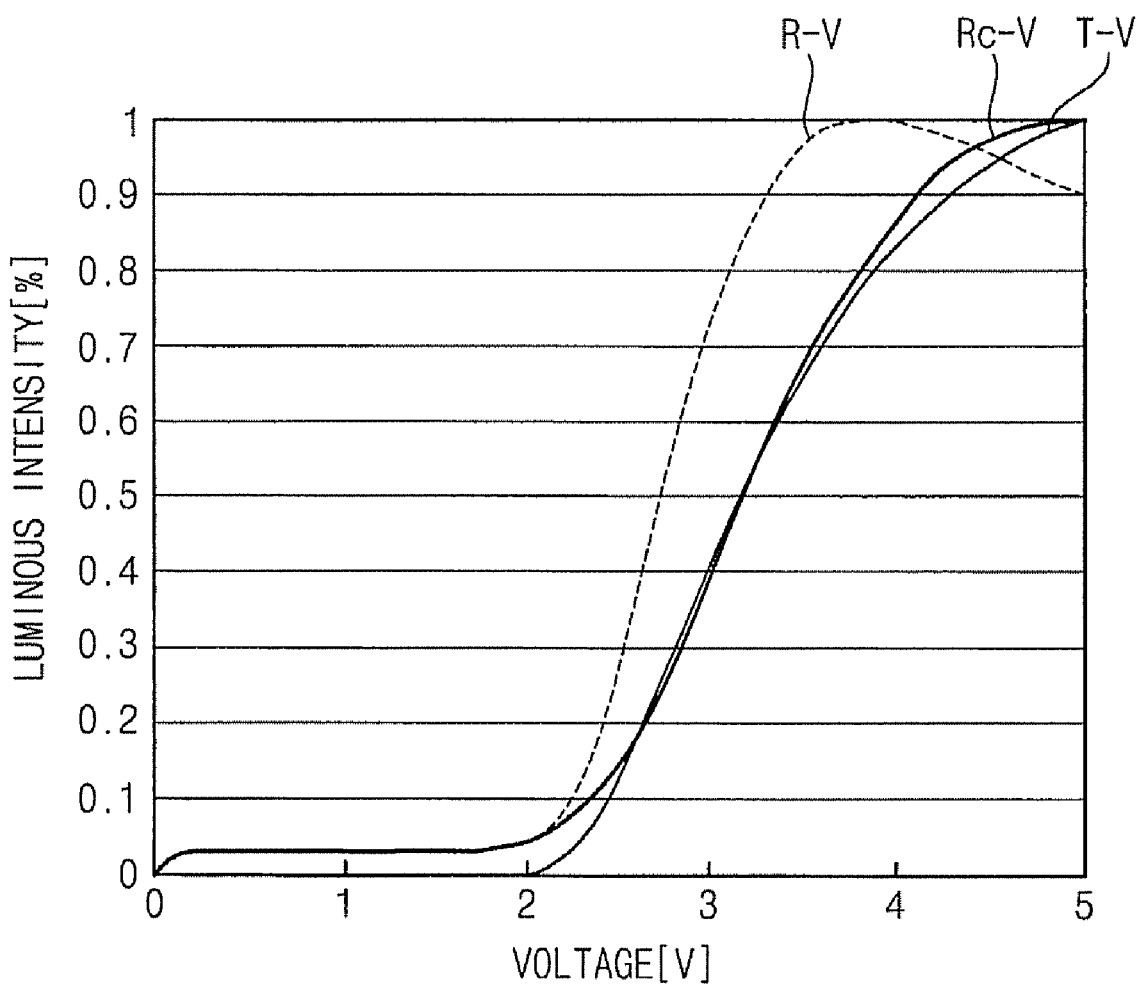
FIG. 15 is a graph showing an improved luminance characteristic versus voltage of an exemplary transflective display device according to the present invention.

FIG. 15 is a graph showing an improved luminance characteristic versus voltage of an exemplary transflective display device according to exemplary embodiments of the present invention.

Referring to FIG. 15, in a conventional transmissivity-to-voltage curve T-V, luminous intensity is the minimum at about 0V. The luminous intensity gradually increases as the voltage gradually increases, and thus the luminous intensity is the maximum at about 5V. In a conventional reflectivity-to-voltage curve R-V, luminous intensity is the minimum at about 0V. The luminous intensity gradually increases as the voltage gradually increases, and thus the luminous intensity is the maximum at about 3.5V. The R-V curve has a characteristic that the luminous intensity decreases when the voltage is larger than about 3.5V.

On the contrary, a reflectivity-to-voltage curve Rc-V according to the reflection voltage, which is generated by the voltage drop of the transmission voltage according to exemplary embodiments of the present invention, almost matches with the T-V curve. Therefore, a uniform luminance characteristic may be achieved in both reflective and transmissive modes.

According to the present invention as described above, a transmission voltage is adjusted to be used as a reflection voltage by using a control voltage, so that an R-V curve may be matched with a T-V curve, while embodying a single cell-gap and using a single voltage. The control voltage may be adaptable for individual transflective display devices to match the R-V and T-V curves of various transflective display devices.

Accordingly, the manufacturing cost may be reduced as compared to a display device using a dual cell-gap and a dual voltage to match the R-V and T-V curves. Particularly, the length of the process is shorter than that of the display device embodying the dual cell-gap, so that the manufacturing cost may be reduced. Moreover, an embodiment of a driving circuit is simplified as compared to the display device using the dual voltage. Therefore, the cost of manufacturing the driving circuit may be reduced.

Although exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:
1. A display device comprising:
a display panel including a plurality of pixel parts, each pixel part comprising:
a transmissive part in which a transmission voltage transmitted through a source line according to activation of a first gate line is charged;

a reflective part in which the transmission voltage is charged; and an adjusting part that adjusts the transmission voltage charged in the reflective part to a reflection voltage based on a control voltage transmitted through the source line according to activation of a second gate line;

a gate driving part outputting first and second gate signals to the first and second gate lines respectively, the first and second gate signals activating both the first and second gate lines in a first period, and activating only the second gate line in a second period;

a source driving part outputting the transmission voltage in the first period; and an output selecting part outputting the transmission voltage to the source line in the first period, and selectively outputting the control voltage to the source line in the second period.

2. The display device of claim 1, wherein the first period is an earlier period of a horizontal period ("1H"), and the second period is a latter period of the 1H.

3. The display device of claim 1, wherein the transmissive part comprises:

a first transistor including a first gate electrode connected with the first gate line;

a first liquid crystal capacitor connected with a first drain electrode of the first transistor; and a first storage capacitor connected with the first drain electrode.

4. The display device of claim 3, wherein the reflective part comprises:

a second transistor including a second gate electrode connected with the first gate line, and a second source electrode connected with the first drain electrode;

a second liquid crystal capacitor connected with a second drain electrode of the second transistor; and a second storage capacitor connected with the second drain electrode.

5. The display device of claim 4, wherein the adjusting part comprises:

a third transistor including a third gate electrode connected with the second gate line, and a third source electrode connected with the source line; and a pumping capacitor including a first terminal connected with a third drain electrode of the third transistor, and a second terminal connected with the second drain electrode.

6. The display device of claim 4, wherein the adjusting part comprises:

a third transistor including a third gate electrode connected with the second gate line, a third source electrode connected with the source line, and a third drain electrode connected with a first source electrode of the first transistor; and a pumping capacitor including a first terminal connected with a third drain electrode of the third transistor, and a second terminal connected with the second drain electrode.

7. The display device of claim 6, wherein a voltage difference ($\Delta V1$) between the transmission voltage and the reflection voltage is defined as a following equation:

$$\Delta V1 = \Delta V2 \times \frac{C_P}{C_{LC} + C_P + C_{ST}},$$

wherein $\Delta V2$ is a voltage difference between the transmission voltage and the control voltage, $C_{LC}$ is capacitance of the second liquid crystal capacitor, $C_{ST}$ is capacitance of the second storage capacitor, and $C_P$ is capacitance of the pumping capacitor.

8. The display device of claim 6, wherein the first liquid crystal capacitor includes a transparent electrode connected with the first drain electrode, and the second liquid crystal capacitor includes a reflective electrode connected with the second drain electrode.

9. The display device of claim 6, further comprising a voltage generating part outputting the control signal, the voltage generating part further outputting a common voltage to common electrodes of the first and second liquid crystal capacitors and to common electrodes of the first and second storage capacitors, respectively.

10. The display device of claim 9, wherein the control voltage has substantially a same electric potential level as the common voltage.

* * * * *